United States Patent
Batchelor et al.

(10) Patent No.: US 6,578,102 B1
(45) Date of Patent: Jun. 10, 2003

(54) TRACKING AND CONTROL OF PREFETCH DATA IN A PCI BUS SYSTEM

(75) Inventors: Gary William Batchelor, Tucson, AZ (US); Michael Thomas Benhase, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/551,862

(22) Filed: Apr. 18, 2000

(51) Int. Cl.[7] .............................................. G06F 13/00
(52) U.S. Cl. ...................................................... 710/310
(58) Field of Search ............................... 711/201, 105; 710/52, 311, 308, 310

(56) References Cited

U.S. PATENT DOCUMENTS

| | | | |
|---|---|---|---|
| 4,910,664 A | | 3/1990 | Arizono ...................... 364/200 |
| 5,459,847 A | | 10/1995 | Okamura ............... 395/421.03 |
| 5,574,944 A | * | 11/1996 | Stager ........................... 710/5 |
| 5,761,464 A | * | 6/1998 | Hopkins ..................... 710/310 |
| 5,815,677 A | * | 9/1998 | Goodrum ................... 710/310 |
| 5,872,939 A | | 2/1999 | Ramsey et al. ............. 395/300 |
| 5,941,981 A | | 8/1999 | Tran ........................... 712/207 |
| 5,954,801 A | * | 9/1999 | Sokolov ........................ 710/5 |
| 6,119,203 A | * | 9/2000 | Snyder et al. .............. 711/137 |
| 6,125,435 A | * | 9/2000 | Estakhri et al. ............. 711/201 |
| 6,145,017 A | * | 11/2000 | Ghaffari ........................ 710/5 |
| 6,480,942 B1 | * | 11/2002 | Hirairi ........................ 711/156 |
| 6,490,647 B1 | * | 12/2002 | Batchelor et al. ........... 710/310 |
| 6,502,157 B1 | * | 12/2002 | Batchelor et al. ........... 710/310 |

* cited by examiner

*Primary Examiner*—Paul R. Myers
(74) *Attorney, Agent, or Firm*—John H. Holcombe

(57) ABSTRACT

A system and method track and control the prefetching of blocks of a data stream in a PCI bus system, avoiding unnecessary prefetches. The data stream is grouped into major blocks which comprise a fixed plurality of contiguous blocks. A prefetch buffer stores the blocks of data prefetched from a PCI data source for transfer to a requester. First and second associated prefetch count storage locations store first and second counts initialized by prefetch initialization logic. The first count represents the number of blocks of data of a major block of the data, and the second count represents the total number of the blocks of the data stream to be prefetched, less the initialized number of blocks of the first count. As each block of data is prefetched, a prefetch counter decrements the first count by a number representing the block of data. As the prefetch counter decrements the first count to zero, prefetch count logic stops the prefetch, allowing completion of the transfer of the prefetched data to the data destination. Thus, the second count represents the next remaining number of blocks to be prefetched, and the requester can rotate to a different read request at the end of a major block, knowing the next major block will not be prefetched until requested.

15 Claims, 4 Drawing Sheets

TRACKING AND CONTROL OF PREFETCH DATA IN A PCI BUS SYSTEM

DOCUMENTS INCORPORATED BY REFERENCE

Commonly assigned U.S. Pat. application Ser. No. 09/275,610 is incorporated for its showing of a PCI bus bridge system for processing requests from multiple attached agents.

FIELD OF THE INVENTION

This invention relates to read prefetch buffers in PCI bus systems which transfer blocks of prefetched data to be read, and, more particularly, to the use of a prefetch counter in tracking and controlling the data at the PCI bus system prefetch buffers.

BACKGROUND OF THE INVENTION

The Peripheral Component Interconnect (PCI) bus system is a high-performance expansion bus architecture which offers a low latency path employing PCI bridges through which a host processor may directly access PCI devices. In a multiple host environment, a PCI bus system may include such functions as data buffering and PCI central functions such as arbitration over usage of the bus system.

The incorporated '610 application describes an example of a complex PCI bus system for providing a connection path between a secondary PCI bus, to which are attached a plurality of hosts or host channel adapters, and at least one primary PCI bus, to which are attached a plurality of peripheral devices, and allows the prefetching of data for read transactions of multiple channel adapters in parallel. The incorporated '610 application additionally defines many of the terms employed herein, and such definitions are also available from publications provided by the PCI Special Interest Group, and will not be repeated here.

Major computer systems may employ PCI bus systems to provide fast data storage from hosts, such as network servers, via channel adapters and the PCI bus system, to attached data storage servers having storage devices, cache storage, or non-volatile cache storage.

A channel adapter (an adapter coupling a host system to a secondary PCI bus) attempts to read large amounts of data at once from a data storage or memory device (a non-volatile store or a data storage device adapter or controller processor coupled to a primary PCI bus), such as transactions of a contiguous string of a number of blocks of data. The PCI bus architecture does not define the total amount of data to be accessed in an operation, and balances the need for high throughput for a given channel adapter with the need for low latency between access by other agents by requiring that read operations be broken up. This is because read operations require time for the command to pass through the bus, time to access the data at the source of the data, and time for passage of the data back through the bus system. To allow a read operation to monopolize the bus to complete access to the total amount of the data at one time would be very inefficient and would substantially reduce the effective bandwidth of the PCI bus system.

One method for reducing latency is the prefetch operation in which data is read from a data source in anticipation that a requesting data destination will need the data. The data is read from the data source and stored in a prefetch buffer and then is read from the prefetch buffer by the requesting data destination device. Typically, the original agent requesting data is disconnected from the PCI bus after the data request and during the prefetch operation, and another agent is granted access to the PCI bus. As discussed in the incorporated '610 application, a problem was that, while an original agent was disconnected to allow access by another agent, a read operation by the other agent would be for data having a different address, and the PCI bus system would flush any as yet unread prefetched original data as having an incorrect address, so as to make room for the desired data of the other agent. Thus, in the incorporated '610 application, a plurality of parallel FIFO buffers are provided. Thus, read transactions of multiple agents, such as channel adapters, are allowed to be processed in parallel by allowing prefetched data blocks for different requesting agents to be stored in different parallel FIFO buffers without being flushed. The prefetched data remains buffered for later retry of a read request by the original requesting agent even if another agent issues an intervening read request. After being disconnected, the original agent then retries the read access at its allocated parallel buffer, and will be granted access after all the other requesting agents coupled to the secondary bus have been granted access. The prefetch buffer allocated to the original agent will retain the data that had been incompletely loaded and will continue to be loaded as the data is accessed. Upon the grant of one of the retries by the original agent, and completion of the major block of data, the major block is transferred to the requesting agent.

However, a prefetch operation for a lengthy stream of data may still tend to monopolize the secondary PCI bus. Hence, the PCI bus architecture, e.g., of the incorporated '610 application, may limit single read data transfers to major blocks of data, such as eight prefetch requests, each of small blocks or groups of 512 bytes, or a total of 4K bytes.

In the prior art, the major block limit on a read prefetch may be implemented by the channel adapter, which counts the data received and stops the read request, or may be implemented by the PCI bus arbiter, which counts the transferred data and terminates the grant. In either case, a prefetch counter is required to track the amount of data remaining to be prefetched and read.

A problem is that the channel adapter typically queues a series of operations for the host system, and, if one operation is interrupted, the channel adapter sequences to the next operation, only later returning to the original operation. The incorporated '610 application handles this problem by assigning address windows to the sources of data attached to the bus system. Thus, a separate prefetch counter may be provided for each read operation of a channel adapter, as based on the address window of that operation. Typically, during the prefetch operation, the original requesting agent will access the prefetch buffer and begin reading the contents of the prefetch buffer. If the prefetch and the read operations are conducted smoothly and continuously, after a 512 byte increment is read, a new 512 byte prefetch is begun, maintaining the queued 2K bytes of prefetched data. This will continue until all the data that has been set up in a prefetch counter has been prefetched, or the read operation is interrupted.

However, typically, the prefetch has loaded data into the prefetch buffer when the read operation is interrupted, leaving part of the data loaded in the allocated prefetch buffer.

Also, the read operation requires a delay before the data is accessed from the source device and supplied to the prefetch buffer. Additionally, not all of the data comprising a major block of data may be accessed in a single transaction, and only a portion of the data is loaded into the prefetch buffer, leading to a delay. Hence, the requesting agent is disconnected after the delay exceeds a predetermined time, and another agent allowed access, even though part of the data is loaded in the prefetch buffer.

The problem this creates is that the channel adapter may start another read operation at the same prefetch buffer. This will cause the prefetch logic to flush all the queued and unread data and start prefetching data for the new read operation. The adapter will get prefetched data for the new read operation, and then may continue with the previous read. Again, the prefetch logic will flush all the queued data and start prefetching data that was prefetched previously. As can be seen, this thrashing causes unwanted read prefetch operations and results in reduced efficiency.

As an alternative, each read could be set for only a major block of data and a new prefetch count established for each new read operation. However, establishing a prefetch count is itself an added transaction in which the prefetch count is written to a storage location of a prefetch counter. As can be seen, the unwanted transactions of establishing a new prefetch count for each major block also results in reduced efficiency.

SUMMARY OF THE INVENTION

An object of the present invention is to increase the efficiency of read operations relating to data streams of a plurality of contiguous blocks by reducing unwanted read prefetches.

A system and method are disclosed for tracking and controlling the prefetching of blocks of a data stream stored at a prefetch buffer in a PCI bus system. The PCI bus system has a plurality of PCI busses, and at least one PCI data destination which requests the read operation is coupled to a first of the plurality of PCI busses. Additionally, at least one PCI data source is coupled to a second of the plurality of PCI busses, and a prefetch buffer is provided for storing blocks of data prefetched from the PCI data source in response to a read command by the requester. The blocks of the data stream are stored at the prefetch buffer for transfer to the data destination, and the data comprises a data stream that is capable of being grouped into major blocks comprising a fixed plurality of contiguous blocks.

First and second associated prefetch count storage locations are provided for storing, respectively, first and second counts. Prefetch initialization logic initializes the first count which represents the number of blocks of data comprising up to a major block of the data, and no more than the total number of the blocks of the data stream. The prefetch initialization logic sets the second count as representing the total number of the blocks of the data stream to be prefetched and stored in the prefetch buffer, less the initialized number of blocks of the first count.

A prefetch counter is coupled to the first and the second prefetch count storage locations. As each block of data is prefetched and stored at the prefetch buffer, the prefetch counter decrements the first count by a number representing the block of data. Prefetch count logic coupled to the prefetch counter, responds to the prefetch counter decrementing the first count to zero, and stops the prefetch, allowing completion of the transfer of the prefetched stored data to the data destination. Thus, the second count represents the next remaining number of the blocks of the data stream to be prefetched, stored and transferred.

The requester can thus maintain its request for the data at the end of one major block, knowing that the next major block will be prefetched. The requester will therefore avoid requesting a different read operation and will avoid unnecessary prefetches.

Additionally, the prefetch counter, upon the completion of the transfer of the prefetched stored data to the data destination, refreshes the first count representing the number of the blocks of data comprising up to a major block of the data, and no more than the remaining second count. Then, the prefetch counter decrements the second count by the first count, the second count thereby representing the next remaining number of the blocks to be prefetched and stored. Then, again, upon the PCI bus system prefetching and storing each block of data at the prefetch buffer, the prefetch counter decrements the first count by a number representing the block of data. The prefetch count logic, again, upon the prefetch counter decrementing the first count to zero, stops the prefetch, allowing completion of the transfer of the prefetched stored data to the data destination.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
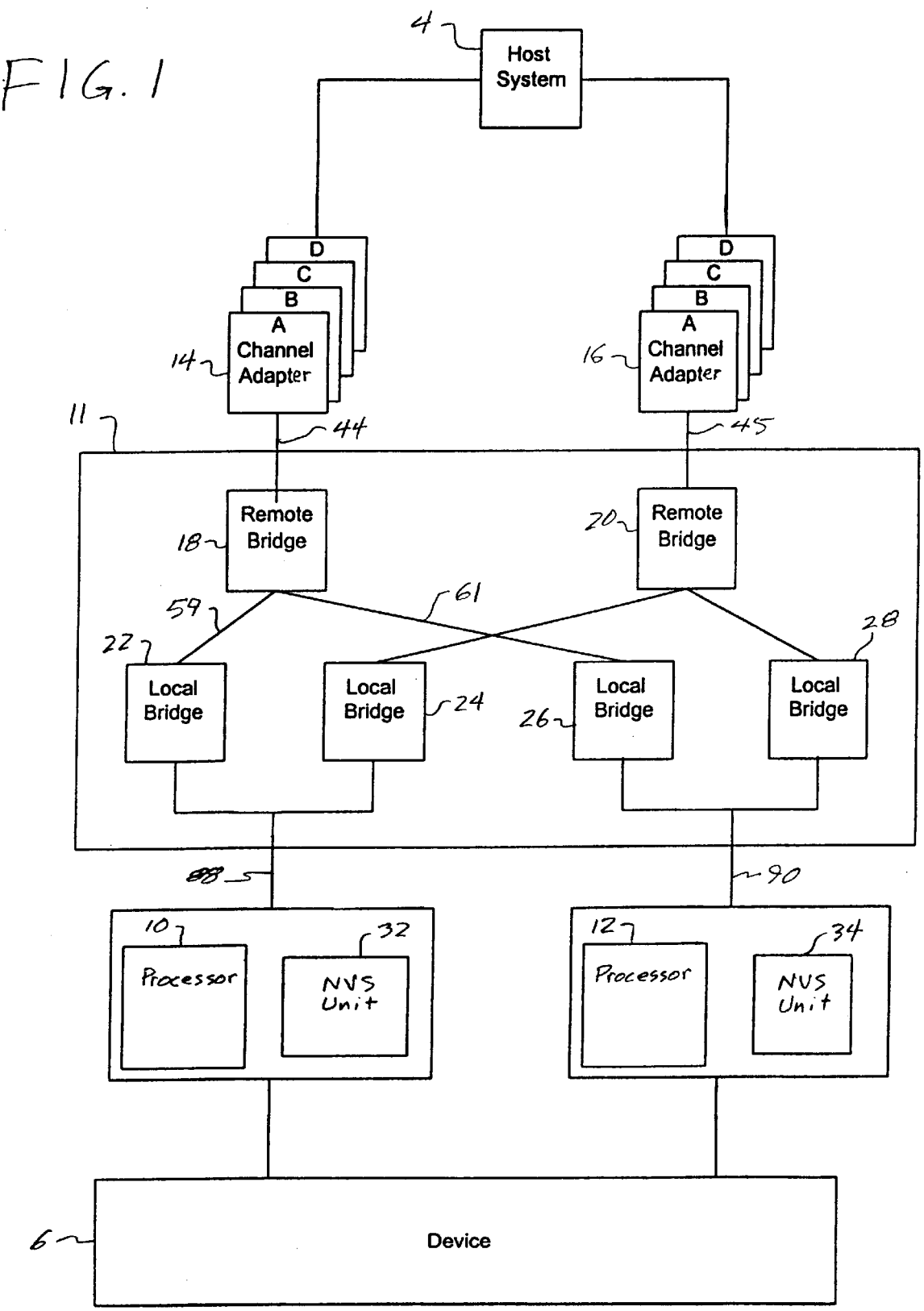
FIG. 1 is a block diagram of a PCI bus system in accordance with an embodiment of the present invention and attached host systems and devices.

Referring to FIG. 1, a PCI bus system 11 is illustrated in accordance with an embodiment of the present invention which provides communication paths, for example, between one or more host systems 4 and devices such as processors 10, 12, a device 6, and NVS (non-volatile store) units 32, 34. The exemplary PCI bus system 11 is based upon that illustrated in the incorporated '610 application, employing similar components, modified in accordance with the present invention. As discussed in the incorporated '610 application, the device 6 may comprise a direct access storage device subsystem, such as a string of DASDs.

The PCI bus system 11 allows the host systems 4 to communicate with the processor 10, 12, employing adapters 14A, B, C and D, 16A, B, C and D or other communication agents (not shown), including any device that typically communicates over a PCI bus. The channel adapters 14, 16 may comprise channel adapter cards that are each connected via a slot on the PCI bus system to a remote bridge 18, 20 of the PCI bus system 11. Each channel adapter card provides a connection to one or more host systems 4 at a secondary PCI bus 44, 45. Briefly, processor 10 controls a primary PCI bus 88, and processor 12 controls a primary PCI bus 90, each providing addresses for access by the adapters 14, 16 at secondary PCI busses 44, 45.

Two remote bridges 18, 20 may be provided coupled to different sets of channel adapters or other communication agents, and each remote bridge is coupled to local bridges. Thus, remote bridge 18 is coupled to local bridges 22, 26, and remote bridge 20 is coupled to local bridges 24, 28. In the instant example, the local bridges 22, 24 may communicate with processor 10 and NVS unit 32 on primary PCI bus 88, and the local bridges 26, 28 may communicate with processor 12 and NVS unit 34 on primary PCI bus 90, although other arrangements may be envisioned by those of skill in the art. Thus, in the present example of a PCI bus system, the adapters 14A–D coupled to remote bridge 18 may communicate with the processors 10, 12 or NVS unit 32, 34 over the PCI bus system 11.

An important communication in a PCI bus system is the reading of stored data by a host system 4 at the NVS units 32, 34 and at a device 6, the data stored in the selected unit or device under the control of the processor 10, 12. Host systems typically deal with and process large amounts of data and require prompt access to, or storage of, that data to allow the host systems to continue processing without substantial wait times. Therefore, low latency of the bus system is required for such prompt access or storage. The Peripheral Component Interconnect (PCI) bus system is a high-performance expansion bus architecture which offers such a low latency path employing PCI bridges through which a host processor may directly access PCI devices.

In a multiple host environment, a PCI bus system may include such functions as data buffering and PCI central functions such as arbitration over usage of the bus system. As the result, the PCI bus systems become increasingly complex.

The data to be stored is typically customer data which is written as a burst of contiguous blocks of data which will be retrieved at a subsequent time. It is important to the customer that the data is retrieved as contiguous blocks and not as scattered read operations.

In PCI bus systems, the channel adapters 14, 16 attempt to read large amounts of data in a single operation, such as reading a contiguous string of a number of blocks of data. As discussed above, read operations are notoriously slow, so the PCI architecture requires that the read operations be broken up to allow access by other agents on the bus system.

Figure 2:
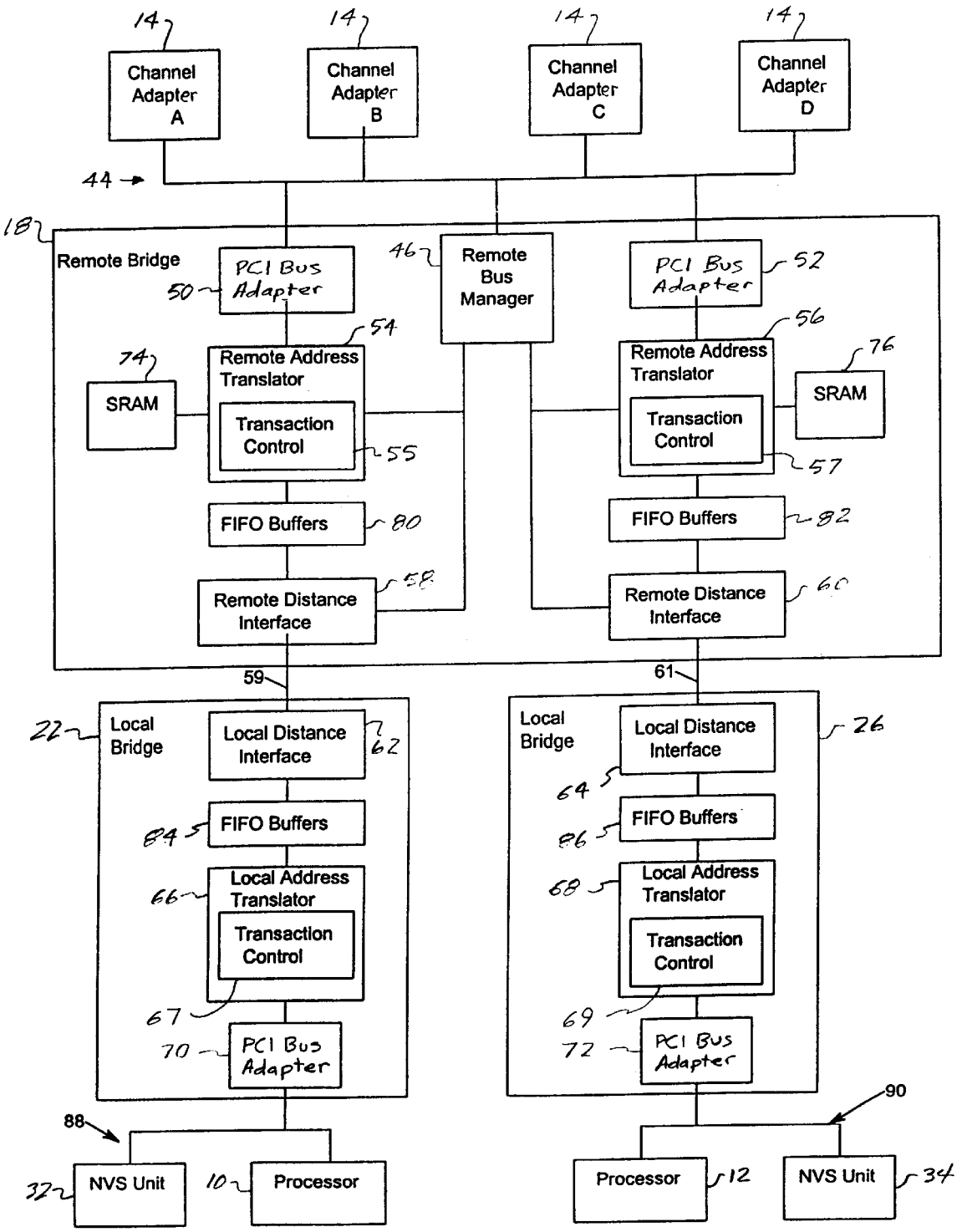
FIG. 2 is a block diagram of the PCI bus system of FIG. 1, illustrating a PCI remote bridge and two PCI local bridges.

Referring additionally to FIG. 2, further detail of one-half of the exemplary complex PCI bridge system of FIG. 1 is illustrated. As discussed in the incorporated '610 application, complex PCI systems employ prefetch capability for reading data and employ arbitration between commands from the attached channel adapters on the secondary PCI bus to manage the usage of the bus system in an efficient manner. In the example of FIG. 2, the prefetch and arbitration are directed by a bus manager 46. For arbitration, the PCI bus manager 46 grants the commands from the channel adapters 14A–D on secondary PCI bus 44 in a round-robin fashion. An element of PCI bus architecture is that, because PCI read commands are extremely slow operations to complete, especially in complex PCI bus systems with multiple hosts and with multiple PCI bridges between the channel adapters and the storage devices, the read operation is interrupted and the requesting adapter is disconnected from the bus, so as to allow other uses of the bus by other requesters.

The exemplary PCI bus system of FIG. 2 includes the PCI bus manager 46 which manages data and signals presented on the secondary PCI bus 44. The PCI bus manager 46 comprises bus central resource functions, which include circuitry that manages the bus arbitration discussed above, bus parking, and other bus management functions, preferably with standalone circuitry. The bus manager 46 has information describing the address ranges of the agents attached to the remote bridge 18, the PCI bus adapters 50 and 52, and other elements of the remote bridge, and uses this information to determine which agent or element is targeted by a PCI operation. The information on the address ranges was provided at initialization and is preferably written to registers in the bus manager 46, and may be copied to the PCI bus adapters. The remote bridge 18 also comprises remote address translators 54, 56, transaction controls 55, 57, remote distance interfaces 58, 60, and static random access memories (SRAM) 74, 76, or any other suitable memory devices. The PCI bus adapter 50, remote address translator 54, transaction control 55, and remote distance interface 58 provide communication between channel adapters 14A–D and local bridge 22. The PCI bus adapter 52, remote address translator 56, transaction control 57, and remote distance interface 60 provide communication between channel adapters 14A–D and local bridge 26. The channel adapters 14A, B, C, D communicate with either PCI bus adapter 50 or 52 via the secondary PCI bus 44. The PCI bus adapters 50, 52, remote address translators 54, 56, transaction control 55, 57, remote distance interfaces 58, 60 and SRAMs 74, 76 may comprise logical elements of PCI bridges as are known in the art or any other suitable type of bridge circuitry. The remote 58, 60 and local 62, 64 distance interfaces include controls and buffers known in the art to control transactions between the remote bridge 18 and the local bridges 22, 26 and provide for long distance communication therebetween over long distance connections 59, 61. Referring to FIG. 1, the remote bridge 20 may be the same or similar to the remote bridge 18, and provides communication with the local bridges 24, 28.

Referring to FIG. 2, each local bridge 22, 26 comprises, respectively, a local distance interface 62, 64, a local address translator 66, 68, a transaction control 67, 69, and a PCI bus adapter 70, 72. The remote 54, 56 and local 66, 68 address translators include circuitry known in the art to map a received address to another address space. Remote address translators 54, 56 perform address translation operations by mapping an address provided by channel adapters 14 to the address space of the local PCI bus adapters 70, 72, respectively. Local address translators 66, 68 map an address from the local PCI bus adapters 70, 72 to the remote PCI bus adapter 50, 52 address space, such that this translated address is transmitted to the remote address translator 54, 56 via the local 62, 64 and remote 58, 60 distance interfaces. In such case, the remote address translator 54, 56 may buffer and transmit this received address to the remote PCI bus adapters 50, 52. Similarly, after remote address translator 54, 56 translates an address received from the remote PCI bus adapter 50, 52 to the address space of the local PCI bus adapter 70, 72, respectively, this translated address is transmitted to the local address translator 66, 68 via the remote 58, 60 and local 62, 64 distance interfaces. In such case, the local address translator 66, 68 may buffer and transmit this received address to the local PCI bus adapter 70, 72.

The PCI busses 44, 88 and 90 are designed for only very short distances, measured substantially in inches, and small loads, and the distance connections 59, 61 are designed for longer distances with greater loads.

As discussed above, to allow a read operation to monopolize the bus for access to the total amount of the data at one time would be very inefficient and would substantially reduce the effective bandwidth of the PCI bus system.

Figure 3:
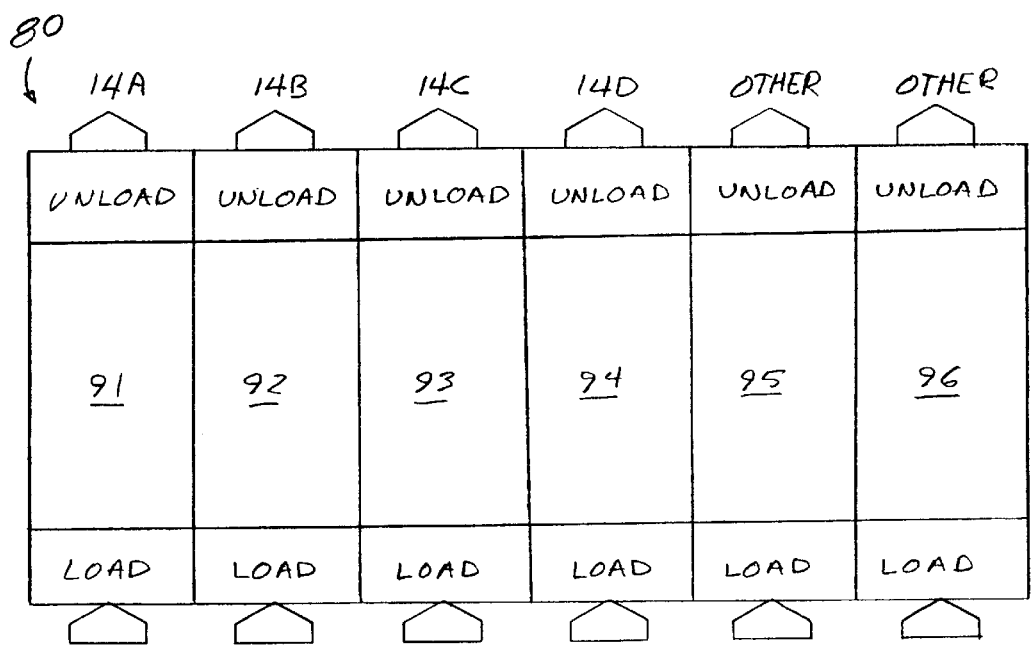
FIG. 3 is a diagrammatic representation of FIFO buffers of FIG. 2.

One method for reducing latency is the prefetch operation in which data is read from a data source in anticipation that a requesting data destination will need the data. The data is read from the data source and stored in a prefetch buffer 80, 82 and then is read from the prefetch buffer by the requesting data destination device, such as a channel adapter 14A–D. Thus, in a complex bus system, as discussed in the incorporated '610 application, read transactions of multiple agents, such as channel adapters 14A–D, are allowed to be processed in parallel by allowing prefetched data blocks for different requesting agents to be stored in different parallel prefetch locations which are arranged as parallel FIFO buffers 80, 82. Referring additionally to FIG. 3, each channel adapter 14A–D attached to the remote bridge 18 has a parallel FIFO buffer comprising a section or location of a FIFO buffer 80, 82. In FIG. 3, the sections of FIFO buffers 80 may comprise buffers 91–96, each having the appropriate load/unload circuitry, and be assigned, respectively, to the channel adapters 14A, B, C, D and other agents coupled to the secondary PCI bus 44, such as PCI bus adapters 50, 52, for read operations. As discussed in the incorporated '610 application, other sections of the FIFO buffers may be employed for write operations and for control.

Referring to FIG. 2, the sections of the FIFO buffers 80, 82 of the remote bridge 18 and the sections of FIFO buffers 84, 86 of the local bridges 22, 26 queue the read/write transactions in the PCI bus system 11. Each of the sections of FIFO buffers queue the transaction from the channel adapters 14A–D, and the address translators 54, 56, 66, and 68 include transaction control circuitry that includes logic to select sections of the FIFO buffers to place a transaction and manage the flow of transactions. In the prior art, the total amount of prefetch data remaining to be accessed for each section of the associated FIFO buffer is tracked in a prefetch count stored in a storage location of the SRAM 74, 76. As discussed above, a plurality of prefetch counts may be stored in separate locations for different channel adapters, and for different read operations of the same channel adapter.

Thus, should a channel adapter 14A–D become disconnected, the prefetched data remains buffered for later retry of a read request by the original requesting agent even if another agent issues an intervening read request. After being disconnected, the original agent then retries the read access at its allocated parallel buffer, and will be granted access after all the other requesting agents coupled to the secondary bus have been granted access. The prefetch buffer allocated to the original agent will retain the data that had been incompletely loaded and will continue to be loaded as the data is accessed. Upon the grant of one of the retries by the original agent, and completion of the major block of data, the major block is transferred to the requesting agent.

As discussed above, continuous burst read operations must be interrupted and broken into read prefetch operations of major blocks of data. Hence, a requesting adapter is disconnected from the PCI bus, even though part of the data is loaded in the prefetch buffer.

As the result, a read operation that is intended to be a burst operation for the channel adapter 14A–D becomes segmented into many short read operations using the prefetch of the prior art. The problem this creates is that the original agent (channel adapter) may start another read operation. This will cause the prefetch logic to flush all the queued and unread data from the FIFO 80, 82 and start prefetching data for the new adapter read. The adapter will get prefetched data for the new read operation, and then may continue with the previous read. Again, the prior art prefetch logic will flush all the queued data and start prefetching data that was prefetched previously. As can be seen, this causes unwanted read prefetch operations to access the previously prefetched data and results in reduced efficiency. The alternative of establishing a new prefetch count for each prefetch also results in reduced efficiency by requiring extra transactions to write the new prefetch counts.

In accordance with the present invention, a dual prefetch count 110 is employed as illustrated with reference to FIG. 4. The prefetch count may be stored at the same location, e.g., in SRAM 74, 76, as the prior art prefetch count. Specifically, a first count 112 represents the number of blocks of data to be prefetched in the first stage of a prefetch and read operation. Subsequent to the first stage of the prefetch, the present invention will release the secondary PCI bus 44 to allow other agents access to the bus, while the requesting adapter 14A–D understands that it will be able to return to the FIFO buffer 80, 82 and conduct the next stage of the read operation. In accordance with the present invention, each stage of the prefetch and read operation comprises a major block of the data. Thus, the first count "A" 112 represents up to a major block of the data, and no more than the total number of the blocks of the data stream. The second count "B" 114 represents the number of the blocks of the data stream remaining to be prefetched and read after the present stage is completed. Thus, the second count is initially set to represent the total number of blocks of the data stream to be prefetched and stored in the prefetch buffer, less the initialized number of blocks of the first count "A" 112.

Figure 5:
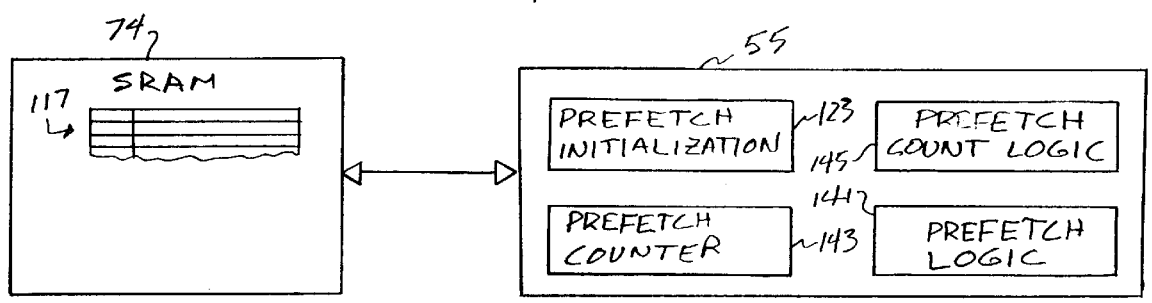
FIG. 5 is a block diagram of an embodiment of a transaction control and a SRAM of FIG. 2 arranged in accordance with the present invention.
Figure 6:
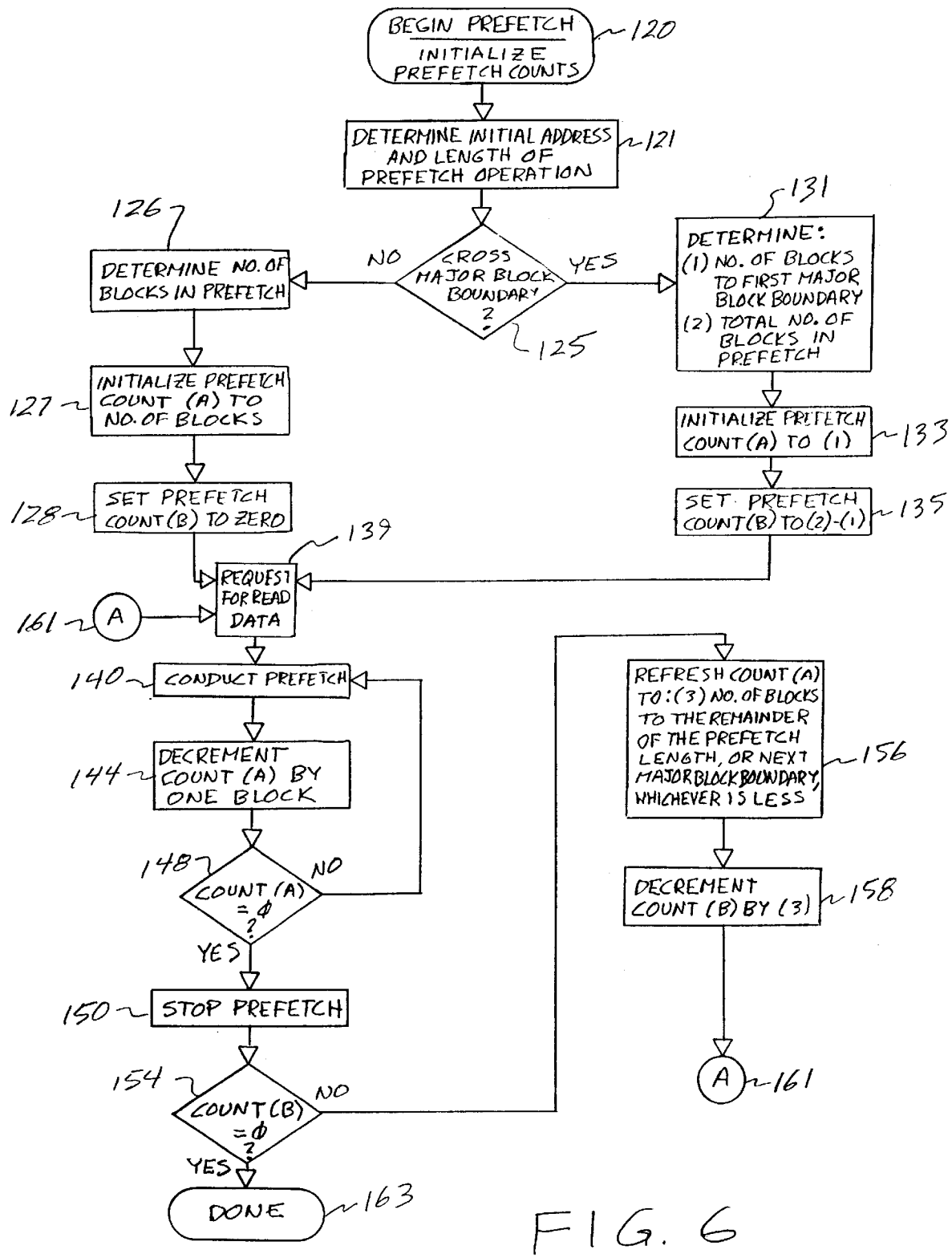
FIG. 6 is a flow chart depicting an embodiment of the method of the present invention.

Referring additionally to FIGS. 5 and 6, first "A" and second "B" prefetch count storage locations 117 are provided in the SRAM, e.g., SRAM 74, associated with the transaction control, e.g., transaction control 55, and the FIFO buffer, e.g., FIFO buffer 74, of the prefetch. Each of the dual prefetch count storage locations 117 may be associated with a channel adapter and with the prefetch buffer allocated to the channel adapter.

In step 120, the read prefetch operation comprises two steps, beginning with the initialization of the prefetch counts, followed by the request for read data. In step 121, the originating channel adapter 14A–D requests a read operation, which is typically identified by an initial address and by the length of the data to be read, typically as a number of bytes. For the purpose of the prefetch count, either the originating adapter, the remote bus manager 46 of FIG. 2, or the transaction control 55 of FIG. 5, converts this information to numbers representing the number of blocks of data to be prefetched and read for the total read operation.

Figure 4:
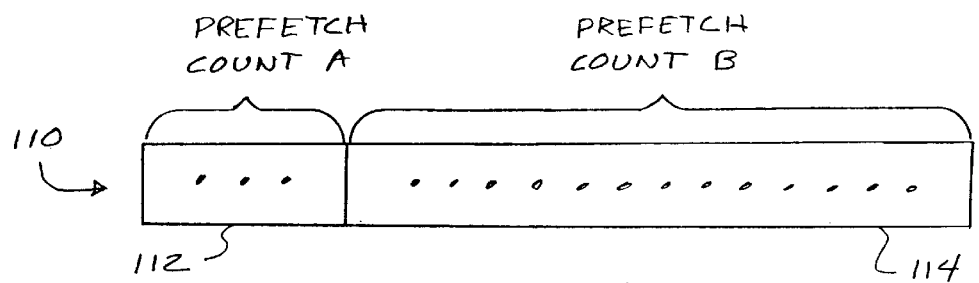
FIG. 4 is a diagrammatic representation of stored prefetch counts in accordance with the present invention.

Referring to FIGS. 4–6, prefetch initialization logic 123 of FIG. 5 initializes the first count 112 which, as discussed above, represents the number of blocks of data comprising up to a major block of the data, and no more than the total number of the blocks of the data stream. Thus, in step 125 of FIG. 6, the prefetch initialization logic 123 determines whether the total length of the prefetch is greater than a major block of data, or whether the initial offset of the data together with its length are sufficient to cross a major block boundary. As discussed above, a major block of data may comprise 4K bytes, or such other size as is best utilized by the PCI bus system to allow sharing of the PCI bus. If the prefetch does not cross a major block boundary, "NO", the prefetch initialization logic 123, in step 126, determines the number of blocks in the prefetch, and, in step 127, initializes the prefetch count "A" 112 at location 117 to a count representing the number of blocks from step 126. Since the total prefetch can be conducted in one stage, the prefetch initialization logic 123, in step 128, sets the prefetch count "B" 114 to zero.

In the more typical situation of a burst read, step 125 indicates that the total length of the prefetch is greater than a major block of data. Thus, the prefetch initialization logic 123 determines, in step 131, first, the number of blocks to the first major block boundary. Typically, addresses of data to be read is to the byte address of the first byte of the data. The first byte of the data does not need to be at a major block boundary, or at a block boundary. Thus, the number of blocks may be determined by comparing the address of the first byte of the data stream to an address ending with a number of zeroes that defines a major block boundary. Thus, a 4K byte major block boundary would comprise an address of "xx*xx000000000000", ending in twelve zeroes. The number of blocks to the major block boundary would include any partial block. Then, still in step 131, the prefetch initialization logic 123** determines the total number of blocks in the prefetch.

In step 133, the prefetch initialization logic 123 initializes the first count "A" 112 at the prefetch count location 117 to a count representing the number of blocks to the first major block boundary determined first in step 131. Additionally referring to FIG. 2, the prefetch count location 117 in SRAM 74 corresponds to the prefetch buffer location 80 at which prefetch data will be stored. Then, in step 135, the prefetch initialization logic 123 sets the second count "B" 114 at the prefetch count location 117 as representing the total number of the blocks of the data stream to be prefetched and stored in the prefetch buffer, less the initialized number of blocks of the first count.

The prefetch counts of the prefetch count storage location 117 respectively represent, whether originated by steps 127 and 128, or by steps 133 and 135, in the first count "A" 112, up to a major block of the data, and no more than the total number of the blocks of the data stream, to be prefetched and read in the first, or only, stage of the prefetch, and in the second count "B" 114, the number of the blocks of the data stream remaining to be prefetched and read after the present stage is completed.

The prefetch operation is then begun when the originating channel adapter 14A–D requests the read data in step 139. Then, at step 140, the prefetch logic 141 conducts a prefetch of a block of data, to a block boundary. For example, if a block comprises 512 bytes, a block boundary has an address ending in nine zeroes. A prefetch counter 143 is coupled to the first and the second prefetch count storage locations 112 and 114 of prefetch count storage location 117. As each block of data is prefetched and stored at the prefetch buffer in step 140, the prefetch counter 143, in step 144, decrements the first count "A" 112 by a number representing the block of data. Prefetch count logic 145, coupled to the prefetch counter, determines, in step 148, whether the prefetch count "A" 112 has been decremented to zero by step 144. If prefetch count "A" 112 is non-zero, the present stage of the prefetch is not yet been completed, and the process cycles back to step 140, so that the prefetch logic 141 can prefetch the next block of data. During the prefetch operation, the original requesting agent (channel adapter 14 A–D) will access the prefetch buffer 80, 82 and begin reading the contents of the prefetch buffer. If the prefetch buffer is 2k bytes in size, and if the prefetch and the read operations are conducted smoothly and continuously, as a block is read from the prefetch buffer, another block is prefetched, maintaining the queued 2K bytes of prefetched data. The prefetch counter 143 decrements the prefetch count "A" 112 for each prefetch block, and the prefetch count logic 145 determines whether the count has decremented to zero in step 148.

If prefetch count "A" has been decremented to zero by the prefetch counter 143, prefetch count logic 145, in step 150, stops the prefetch by prefetch logic 141 at the major block boundary or at the end of data, allowing completion of the transfer of the prefetched data stored in the corresponding prefetch buffer 80 to be transferred to the data destination. Thus, the second count "B" 114 represents the next remaining number of the blocks of the data stream to be prefetched, stored and transferred.

The original requesting agent, e.g., channel adapter 14A–D, thus has completed one major block read at the major block boundary, and can rotate to another read request, knowing that the next major block of the original read request will not be prefetched until requested by the adapter. The requesting agent (adapter) will therefore avoid requesting extra read operations and will avoid unnecessary prefetches.

Next, the prefetch count logic 145, in step 154, determines whether the second prefetch count "B" 114 is zero, indicating that the total prefetch has been completed. If the second prefetch count "B" 114 is non-zero, indicating that the prefetch is not complete, and upon the completion of the transfer of the prefetched stored data to the data destination 14A–D, the prefetch counter 143, in step 156, refreshes the first count "A" 112 representing the number of the blocks of data comprising up to a major block of the data, and no more than the remaining second count. Then, in step 158, the prefetch counter 143 decrements the second count by the first count, the second count thereby representing the next remaining number of the blocks to be prefetched and stored. Then, prefetch logic 141 resumes the prefetch by cycling back, via connector 161, to step 139 to conduct a prefetch of the next block at the next read request.

In accordance with the present invention, the prefetch of burst data therefore continues to store the prefetched data into the corresponding prefetch buffer 80. Also in accordance with the present invention, the requesting agent, e.g., channel adapter 14A–D, will resume the request for the read operation in step 139, because of the certainty that the prefetch is continuing. Thus, there is no opportunity for the requesting channel adapter to move to a different operation.

Thus, again, upon the PCI bus system prefetching and storing each block of data at the associated prefetch buffer 80, the prefetch counter 143, in step 122 decrements the first count "A" 112 by a number representing the block of data. The prefetch count logic 145, again, upon determining in step 148 that the prefetch counter 143 decremented the first count "A" 112 to zero, stops the prefetch in step 150 at the major block boundary or the end of the data transfer, allowing completion of the transfer of the prefetched stored data to the data destination.

Upon the prefetch count logic 145 determining in step 154 that the second count "B" 114 is zero, indicating that all the data has been prefetched and will be transferred, "YES", both the first prefetch count "A" 112 and the second prefetch count "B" 114 are zero, and the prefetch is complete, as indicated by step 163.

As the result of the present invention, the data stream of contiguous blocks has been prefetched and read in a continuing sequence, without interruptions in the process at other than major block boundaries. Completion of the read at a major block boundary assures a complete read without re-requesting the same data, and allows the requester to rotate to another operation, knowing the next major block will not be prefetched until requested by the requester. Thus, the present invention increases the efficiency of read operations relating to data streams of a plurality of contiguous blocks by reducing unwanted read prefetches.

Those of skill in the art will understand that other elements of logic may implement the process of the present invention, and the logic may be implemented in other elements of the PCI bus system than the transaction control 55. Additionally, alternative sequencing of the steps of the present invention may be envisioned by those of skill in the art, and alternative equivalent steps may also be envisioned by those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a PCI bus system for transferring data in the form of data streams comprising a plurality of contiguous blocks, said PCI bus system having a plurality of PCI busses, at least one PCI data destination coupled to a first of said plurality of PCI busses, at least one PCI data source coupled to a second of said plurality of PCI busses, and a prefetch buffer for storing said blocks of said data prefetched from said PCI data source associated as one of said data streams in response to a read command, said blocks of said data stream stored at said prefetch buffer for transfer to said data destination, said contiguous blocks of data capable of being grouped into major blocks comprising a fixed plurality of said contiguous blocks, a method for tracking and controlling said prefetching of said blocks of said data stream stored at said prefetch buffer, comprising the steps of:

initializing a first count representing the number of said blocks of data comprising up to a major block of said data, and no more than the total number of said blocks of said data stream;

setting a second count representing the total number of said blocks of said data stream to be prefetched and stored in said prefetch buffer, less said initialized number of blocks of said first count;

upon prefetching and storing each said block of data at said prefetch buffer, decrementing said first count by a number representing said block of data; and upon said first count decrementing step decrementing to zero, stopping said prefetch and allowing completion of said transfer of said prefetched stored data to said data destination, whereby said second count represents the next remaining number of said blocks to be prefetched, stored and transferred.

2. The method of claim 1, additionally comprising the steps of:

upon said completion of said transfer of said prefetched stored data to said data destination, refreshing said first count representing the number of said blocks of data comprising up to a major block of said data, and no more than said remaining second count;

decrementing said second count by said first count, said second count thereby representing the next remaining number of said blocks to be prefetched and stored; and again conducting said first count decrementing step and said prefetch stopping step.

3. The method of claim 2, wherein said data stream is arranged to have address boundaries between each of said major blocks, and wherein said first count initializing step comprises initializing said first count representing the number of said blocks of data to one of said major block address boundaries.

4. The method of claim 1, wherein said data stream has address boundaries between each of said blocks, wherein said prefetch data stream has an initial address at other than said block boundary, wherein said first count initialization step includes in said first count said data between said initial address and the first said block boundary, and wherein said prefetch stopping step occurs at a block boundary.

5. The method of claim 1, wherein said PCI bus system comprises a plurality of said PCI data destinations, wherein said prefetch buffer comprises a plurality of parallel buffers, at least one of said plurality of parallel buffers assigned to each of said PCI data destinations, and wherein each of said steps, and said first and said second counts of each of said steps, relate to separate ones of said plurality of parallel buffers, each assigned to one of said PCI data destinations.

6. In a PCI bus system for transferring data in the form of data streams comprising a plurality of contiguous blocks, said PCI bus system having a plurality of PCI busses, at least one PCI data destination coupled to a first of said plurality of PCI busses, at least one PCI data source coupled to a second of said plurality of PCI busses, and a prefetch buffer for storing said blocks of said data prefetched from said PCI data source associated as one of said data streams in response to a read command, said blocks of said data stream stored at said prefetch buffer for transfer to said data destination, said contiguous blocks of data capable of being grouped into major blocks comprising a fixed plurality of said contiguous blocks, a system for tracking and controlling said prefetching of said blocks of said data stream stored at said prefetch buffer, comprising:

a first prefetch count storage location for storing a first prefetch count;

a second prefetch count storage location associated with said first prefetch count storage location, said second prefetch count storage location for storing a second prefetch count;

prefetch initialization logic initializing said first count representing the number of said blocks of data comprising up to a major block of said data, and no more than the total number of said blocks of said data stream, and setting said second count representing the total number of said blocks of said data stream to be prefetched and stored in said prefetch buffer, less said initialized number of blocks of said first count;

a prefetch counter coupled to said first and said second prefetch count storage locations, responsive to said PCI bus system, upon said PCI bus system prefetching and storing each said block of data at said prefetch buffer, decrementing said first count by a number representing said block of data; and prefetch count logic coupled to said prefetch counter, upon said prefetch counter decrementing said first count to zero, stopping said prefetch and allowing completion of said transfer of said prefetched stored data to said data destination, whereby said second count represents the next remaining number of said blocks to be prefetched, stored and transferred.

7. The system of claim 6, wherein:

said prefetch counter additionally, upon said completion of said transfer of said prefetched stored data to said data destination, refreshes said first count representing the number of said blocks of data comprising up to a major block of said data, and no more than said remaining second count; decrements said second count by said first count, said second count thereby representing the next remaining number of said blocks to be prefetched and stored; and, again, upon said PCI bus system prefetching and storing each said block of data at said prefetch buffer, decrementing said first count by a number representing said block of data; and said prefetch count logic, again, upon said prefetch counter decrementing said first count to zero, stopping said prefetch and allowing completion of said transfer of said prefetched stored data to said data destination.

8. The system of claim 7, wherein said data stream is arranged to have address boundaries between each of said major blocks, and wherein said prefetch initialization logic initializes said first count representing the number of said blocks of data to one of said major block address boundaries.

9. The system of claim 6, wherein said data stream has address boundaries between each of said blocks, wherein said prefetch data stream has an initial address at other than said block boundary, wherein said prefetch initialization logic initializes said first count, including in said first count said data between said initial address and the first said block boundary, and wherein said prefetch count logic stops said prefetch at a block boundary.

10. The system of claim 6, wherein said PCI bus system comprises a plurality of said PCI data destinations, wherein said prefetch buffer comprises a plurality of parallel buffers, at least one of said plurality of parallel buffers assigned to each of said PCI data destinations, and wherein said system additionally comprises said first and said second prefetch count storage locations for each of plurality of parallel buffers assigned to each of said PCI data destinations, and wherein said first and said second counts relate to separate ones of said plurality of parallel buffers, each assigned to one of said PCI data destinations.

11. A PCI bus system for transferring data in the form of data streams comprising a plurality of contiguous blocks, said contiguous blocks of data capable of being grouped into major blocks comprising a fixed plurality of said contiguous blocks, between at least one PCI data source and at least one PCI data destination, prefetching said data from said PCI data source associated as one of said data streams in response to a read command, and for tracking and controlling said prefetching of said blocks of said data stream stored at said prefetch buffer, comprising: said PCI bus system comprising:

a plurality of PCI busses, said at least one PCI data destination coupled to a first of said plurality of PCI busses, and said at least one PCI data source coupled to a second of said plurality of PCI busses;

a prefetch buffer for storing said blocks of said prefetched data associated as one of said data streams, said blocks of said data stream stored at said prefetch buffer for transfer to said data destination;

a first prefetch count storage location for storing a first prefetch count;

a second prefetch count storage location associated with said first prefetch count storage location, said second prefetch count storage location for storing a second prefetch count;

prefetch initialization logic initializing said first count representing the number of said blocks of data comprising up to a major block of said data, and no more than the total number of said blocks of said data stream, and setting said second count representing the total number of said blocks of said data stream to be prefetched and stored in said prefetch buffer, less said initialized number of blocks of said first count;

a prefetch counter coupled to said first and said second prefetch count storage locations, responsive to said PCI bus system, upon said PCI bus system prefetching and storing each said block of data at said prefetch buffer, decrementing said first count by a number representing said block of data; and prefetch count logic coupled to said prefetch counter, upon said prefetch counter decrementing said first count to zero, stopping said prefetch and allowing completion of said transfer of said prefetched stored data to said data destination, whereby said second count represents the next remaining number of said blocks to be prefetched, stored and transferred.

12. The system of claim 11, wherein:

said prefetch counter additionally, upon said completion of said transfer of said prefetched stored data to said data destination, refreshes said first count representing the number of said blocks of data comprising up to a major block of said data, and no more than said remaining second count; decrements said second count by said first count, said second count thereby representing the next remaining number of said blocks to be prefetched and stored; and, again, upon said PCI bus system prefetching and storing each said block of data at said prefetch buffer, decrementing said first count by a number representing said block of data; and said prefetch count logic, again, upon said prefetch counter decrementing said first count to zero, stopping said prefetch and allowing completion of said transfer of said prefetched stored data to said data destination.

13. The system of claim 12, wherein said data stream is arranged to have address boundaries between each of said major blocks, and wherein said prefetch initialization logic initializes said first count representing the number of said blocks of data to one of said major block address boundaries.

14. The system of claim 11, wherein said data stream has address boundaries between each of said blocks, wherein said prefetch data stream has an initial address at other than said block boundary, wherein said prefetch initialization logic initializes said first count, including in said first count said data between said initial address and the first said block boundary, and wherein said prefetch count logic stops said prefetch at a block boundary.

15. The system of claim 11, wherein said PCI bus system comprises a plurality of said PCI data destinations, wherein said prefetch buffer comprises a plurality of parallel buffers, at least one of said plurality of parallel buffers assigned to each of said PCI data destinations, and wherein said system additionally comprises said first and said second prefetch count storage locations for each of plurality of parallel buffers assigned to each of said PCI data destinations, and wherein said first and said second counts relate to separate ones of said plurality of parallel buffers, each assigned to one of said PCI data destinations.

* * * * *